July 28, 1942.  C. W. MARTIN  2,290,887
TIRE CHANGING TOOL
Filed July 13, 1940  2 Sheets-Sheet 1
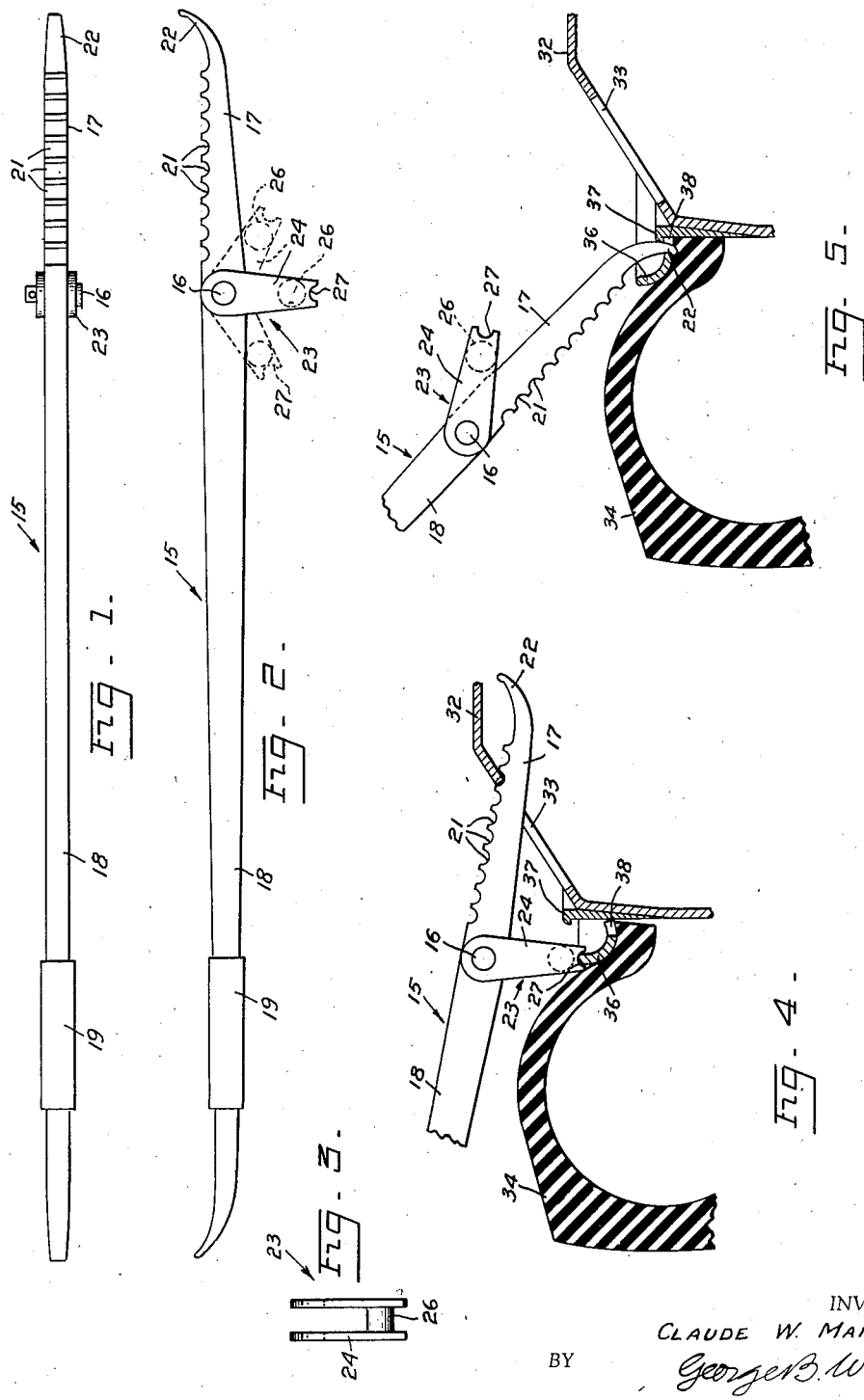
INVENTOR.
CLAUDE W. MARTIN
BY George B. White
ATTORNEY.

July 28, 1942.    C. W. MARTIN    2,290,887
TIRE CHANGING TOOL
Filed July 13, 1940    2 Sheets-Sheet 2
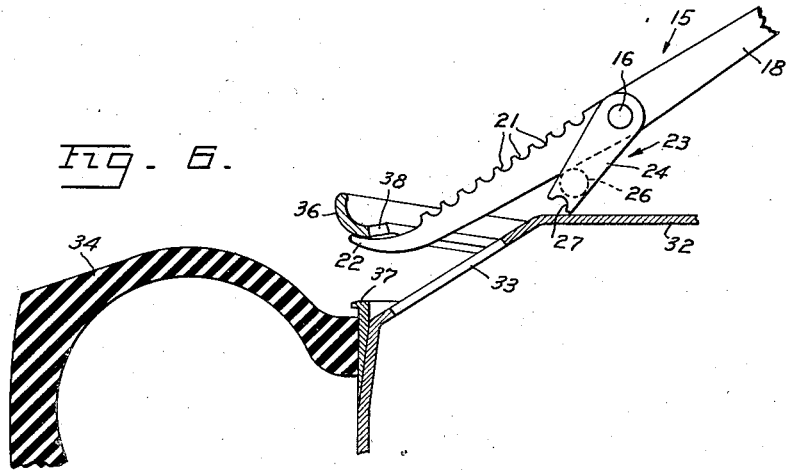
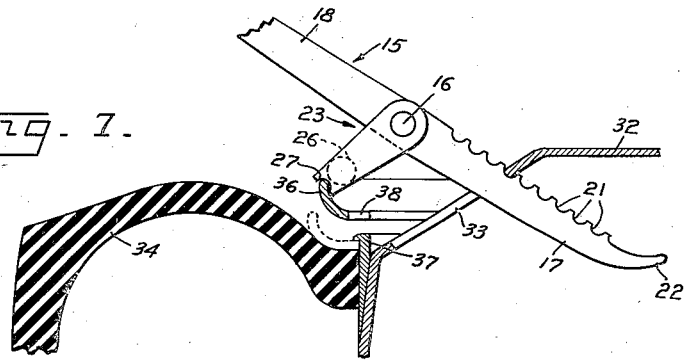
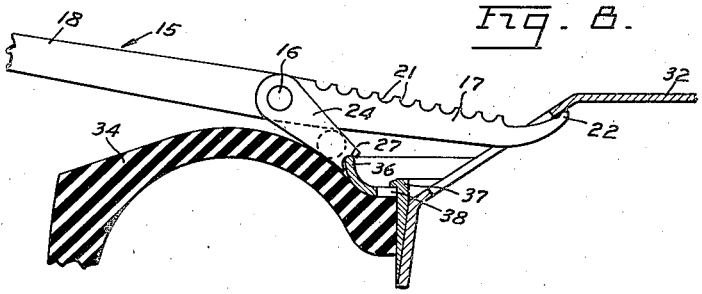
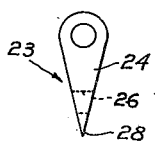 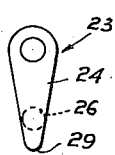 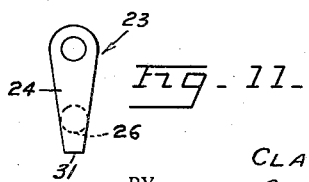
INVENTOR.
CLAUDE W. MARTIN
BY George B. White
ATTORNEY.

Patented July 28, 1942

2,290,887

UNITED STATES PATENT OFFICE 2,290,887

TIRE CHANGING TOOL

Claude W. Martin, Gold Hill, Oreg.

Application July 13, 1940, Serial No. 345,383

2 Claims. (Cl. 157—6)

This invention relates to a tire changing tool.

An object of this invention is to provide a simple and efficient tire changing tool for removing and replacing the lock ring of a wheel with ease.

Another object of this invention is to provide a tire changing tool for removing and replacing the lock ring of a disc wheel wherein the tool is adapted to exert an additional leverage around a secondary fulcrum after the initial prying movement of the tool at the rim, in performing said operation the leverage is first fulcrumed at the rim of the wheel for the initial lifting of the lock ring away from the rim and after the tool is swung to an acute angle over the face of the wheel then means are provided to coact with the wheel disc to form said secondary fulcrum for continued lifting of the lock ring off the rim of the wheel.

Another object of this invention is to provide a tire changing tool for removing and replacing lock rings on disc wheels, especially on disc wheels having at least one opening on the face of the disc; said tool being a unitary lever structure with an auxiliary fulcrum member which is adapted to coact with the face of the disc wheel to form a secondary fulcrum for the lever after the lever completed an initial prying turn from the rim, and said fulcrum member being adapted to transmit pressure from the lever when the lever is fulcrumed in said disc opening and over the lock ring for replacing the latter on the tire and wheel.

Another object of this invention is to provide a tire changing tool one end of which is adapted to be easily engaged either with the lock ring at the rim for prying off the lock ring or to be engaged with the face of the wheel so as to exert a pressure on the lock ring for replacing the lock ring on the rim, an element being provided on the tool to cooperate with said tool end to form a secondary fulcrum for the tool during the removal of the lock ring, and to provide a convenient and efficient pressure connection between the tool and the lock ring during the replacing of the tire and lock ring on the wheel.

Another object of this invention is to provide a lock ring removing and replacing tool for wheels in which the forces exerted on the wheel and the lock ring are adjusted according to the relative position of parts at the various stages of the operation of removal or replacing of tire lock rings and wherein said relative positions are assumed automatically during normal manipulation of the tool; the tool being unitary in structure and sufficient in itself for facile and speedy tire changing.

Another object of this invention is to provide a tire changing tool which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof provided they do not depart from the scope of the claims.

With the foregoing, and other objects in view, which will be made manifest in the following detailed description, reference is had to the accompanying drawings for the illustrative embodiment of the invention, wherein:

Fig. 1 is a view of the tool constructed in accordance with my invention.

Fig. 2 is a side view of my tool.

Fig. 3 is an end view of the fulcrum arm of the tool.

Fig. 4 is a fragmental side view showing the tool in ring loosening position on the wheel.

Fig. 5 is a fragmental side view, partly in section, of the tool at about the beginning of the ring removal.

Fig. 6 is a fragmental, sectional view of the tool in its further ring prying position fulcrumed on the arm on the face of the disc.

Fig. 7 is a fragmental view partly in section, showing the tool in position for pushing the locking ring over the rim of the disc.

Fig. 8 is a fragmental view partly in section showing the tool in position of springing the ring under the edge of the rim of the disc.

Fig. 9 is a detail view of a form of the fulcrum arm with pointed end.

Fig. 10 is a detail view of a fulcrum arm with a rounded point, and

Fig. 11 is a detail view of the fulcrum arm with a square point.

The changing of tires on wheels employing lock rings is a tedious and difficult problem. Usually heretofore at least two bars or levers were used requiring great force to pry off the lock ring before removing the tire and a great deal of hammering and holding was required to force the lock ring back in place when the tire was replaced. These operations in the past necessitated more than ordinary skill and physical strength, and even then the changing of tires on such disc wheels with lock rings involved a great deal of time. My tire changing tool provides such a combination of fulcrums and leverages that even an unskilled person can remove and replace a locking ring of a tire wheel with speed, ease and facility without the use of any additional bar, hammer, or the like, and without the exertion of any undue physical effort.

In carrying out my invention I make use of a hand lever 15 which is divided by a pivot 16 into a shorter end 17 and a longer or handle end 18. The longer end 18 has on it a suitable hand grip 19 which may be formed for instance of rubber or other suitable material. The short end 17 is utilized as a prying end for the removal of lock rings. An edge of the short end 17 has on it spaced notches 21. The endmost notch is curved and the end is suitably pointed or narrowed so as to form a prying point 22. The longer end 18 also terminates in a curved end for general utility.

The axis of the pivot 16 is substantially transverse and at right angles to the row of notches 21. A fulcrum member denoted in its entirety by the reference numeral 23 is pivoted on the pivot 16. This fulcrum member 23 may be of any suitable construction. In the preferred form herein a fulcrum arm 24 is formed by a pair of spaced arm members so as to straddle the lever 15 at the pivot 16. Near the free end of the fulcrum arm 24 is an abutment 26 in the space between the pair of spaced members. The entire fulcrum member 23 is pendulously supported as a unit on the pivot 16. It is to be noted however that the rocking or pivotal movement of the fulcrum member 23 is limited to one side only of the lever 15, namely the fulcrum member 23 moves only on the unnotched edge of the lever 15. In other words the fulcrum member 23 is so installed that it hangs over the side or edge of the lever 15 opposite from the row of notches 21 and it is prevented from swinging past the lever 15 by the abutment 26 which abuts against the adjacent edge of the lever 15 in the extreme pivoted positions of the fulcrum arm 24, as shown in broken lines in Fig. 2.

The point or free end of the fulcrum arm 24 is suitably shaped for engagement with the lock ring for the exertion of pressure thereon in certain operations. In the form illustrated in Fig. 2 the end of the fulcrum arm 24 is provided with sockets 27 which fit over the edge of the object to be pressed. In the form shown in Fig. 9 the free end of the fulcrum arm 24 has a pointed pressure end 28. In the form shown in Fig. 10 the free end of the fulcrum arm is rounded at 29. In the form shown in Fig. 11 the free end of the fulcrum arm 24 is straight across as at the edge 31.

Attention is called to the relative arrangement of the parts of the tool as related to the usual wheels which require lock ring removing and replacing tools. Usually such wheels are of the disc wheel type. An illustrative structure of such a disc wheel is shown fragmentarily in Figures 4 to 8 inclusive of the drawings herein in connection with the various operative positions of my tool. The wheel includes a disc 32 which usually has one or more apertures or openings 33 near the outer periphery or rim thereof. The tire 34 is placed over the felly or rim of the disc 32 and it is held in place by a lock ring 36. The lock ring 36 when in place usually fits into an annular groove or recess formed under a retaining flange 37 on the rim of the wheel. In order to change a tire on this type of wheel it is necessary first to remove the lock ring 36. This involves the prying of the lock ring 36 off the rim of the disc wheel by first pulling it upwardly and outwardly so as to clear the rim flange 37 and then pulling it off the rim. After the tire is replaced in order to hold it in place the lock ring 36 must be also replaced and in this operation the lock ring 36 is put in place at one side first and then it is pushed and pressed by my tool outwardly and over the rim flange 37, and lastly it is pushed into position so as to spring into the annular recess behind the rim flange 37. For accomplishing these operations efficiently the relative positions of the parts of my tool are such that at various stages they effectively engage the respective parts of the wheel.

The order of operation for removal of the lock ring are illustrated in Figures 4 to 6 inclusive of the drawings which show the relative leverages and positions. In the ring loosening operation shown in Fig. 4 the fulcrum arm 24 is held at substantially right angles to the plane of the lock ring 36 and in engagement with the edge of said lock ring. This is accomplished by engaging a properly selected notch 22 of the short lever end 17 with the edge of the disc opening 33 so that the notched edge of the lever 15 faces away from the wheel. The downward pressure of the long lever end 18 presses the fulcrum arm 24 against the lock ring 36 so as to break the tire and lock ring 36 loose from the rim. The spacing of the fulcrum arm 24 and its proportions are such that when one of said notches 22 is engaged with the edge of the disc opening 33 then the fulcrum arm 24 is in the aforesaid position for loosening the lock ring 36. In this manner it can be also determined where the best point may be for the starting of the prying off of the lock ring 36. Usually the lock ring 36 has a hole 38 near its inner periphery for the insertion of a prying tool.

As shown in Fig. 5 the prying point 22 of the short lever end 17 is then inserted into the hole 38 of the lock ring 36 so that the curved notchless back of the point 22 bears against the edge of the rim flange 37 and forms the primary fulcrum for prying off the lock ring 36. Then the long handle end 18 of the lever 15 is pulled toward the center of the wheel while the wheel is held substantially stationary, and the force thus exerted is greatly multiplied in its action around the primary fulcrum at the edge of the rim flange 37. This action forces the lock ring 36 outwardly and upwardly on the wheel. The lever 15 is swung all around so that the portion of the lock ring 36 engaged by the prying point 22 is lifted above the plane of the rim flange 37. The proportion of the curved prying point 22 is such as to locate the portion of the lock ring during this primary removal operation in such position that it remains released at said point.

Then the lever 15 is swung around to a position substantially as shown in Fig. 5 so that the fulcrum member 23 is collapsed against the raised face of the disc 32 and the abutment 26 underlies the short lever end 16. Pressure exerted on the long lever end 18 so as to force it toward the disc 32 forces the short end 17 and the prying point 22 away from the disc 32. It is to be noted that the notches 21 face away from the wheel and the notch of the prying point 22 is engaged with the underside of the lock ring 36. This secondary prying action is fulcrumed at the fulcrum member 23 bearing against the raised face of the disc 32. By successively and circumferentially advancing the prying point 22 along the underside of the lock ring 36 and repeating the prying pull, the lock ring 36 is easily removed from the wheel. The relation between the disc wheel and the fulcrum member and the notched end is such that the notched end can effectively engage the underside of the lock ring 36 while the lever 15 is fulcrumed on the disc 32. In this manner the lever 15 can be swung around if necessary to a position of very small angle to the face of the disc 32 and still have effective fulcrum around which to convert the downward pressure on the long end 18 to an upward pull on the short end 17 and on the prying point 22.

The replacement of the lock ring 36 is also simple. The relation between the arrangement of the notches 22 and the fulcrum member 23 is such that when a suitable notch 22 providing the appropriate leverage is engaged with the disc opening 33, as shown in Fig. 8, then the end of the fulcrum member 23 is bearing on the lock ring 36 at a suitable angle to exert an outward pressure toward the tire. In the form in Fig. 8 the fulcrum member 23 bears against the edge of the lock ring 36 at an angle outwardly and downwardly relatively to the wheel. Downward pressure exerted on the long lever end 18 is so directed by the fulcrum arm 24 that it presses the lock ring 36 outwardly and downwardly sufficiently to permit entrance of the lock side or inner periphery of said lock ring 36, by its own spring effect, into the retaining recess behind the latch or rim flange 37 of the wheel rim. This portion of the lock ring 36 remains in place permitting the circumferential advancement of the tool for engagement of another portion of the lock ring periphery in a similar manner for springing it behind the rim flange 37.

For firm inward engagement of the lock ring 36 the tool may be arranged in the manner shown in Fig. 8, in which position it exerts an inward and downward pressure on the lock ring 36 forcing it against the underside of the rim flange 37. In this operation the short end is so held that it engages the disc opening 33 near its end. In the herein illustration the prying point 22 facing away from the disc 32 is engaged with the edge of the disc opening 33 and the fulcrum arm 24 is directed toward the periphery of the disc 32 at an angle toward the center of the wheel. By exerting downward pressure on the long lever end 18 the fulcrum member 23 is caused to force the lock ring 36 toward the rim flange 37.

In all instances the leverage is proportionate to the relative positions of the notches 21 and the fulcrum member 23 with respect to the respective parts of the wheel. The tool should be made of such dimensions as to be easily carried and manipulated. During the operations of removal or replacement of the lock ring, the wheel can be held relatively stationary in any suitable manner, for instance by holding it in place by the foot of the operator. The long lever preferably should be of convenient length for such manipulation, yet long enough to exert the desired leverage. For instance a long end of about thirty inches from the pivot was found satisfactory. The tool is simple, unitary, does not require any particular setting up or adjustment, and it can be easily handled by unskilled persons. The lock ring can be removed and replaced with my tool quickly by the use of one hand only. The same can be readily used on split lock rings as well as solid lock rings. The plurality of notches 21 at the prying end 17 meets the requirements of different types of rims with differently spaced holes so as to locate the fulcrum member in desired angular positions.

I claim:

1. A tire lock ring tool for removing and replacing lock rings of disc wheels, said disc wheels having circumferentially spaced openings on the disc portion thereof, comprising a hand lever, a fulcrum member pivoted to said hand lever at a portion nearer to one end of said hand lever, a plurality of spaced engagement elements near said end of said hand lever on the side opposite to said fulcrum member, means to limit the pivotal movement of said fulcrum member to the side of the lever opposite to said engagement elements, the said end of the lever being curved for prying engagement with the lock ring on the wheel, said fulcrum member being arranged on the lever so as to selectively engage the lock ring for pressing the lock ring in place on the wheel when leverage is exerted thereon by engagement of any of said engagement elements with an opening in the disc, or to abut in collapsed position against the face of the disc wheel so as to form a fulcrum for the lever when said end of the lever is engaged with the lock ring for removing the same.

2. A tire lock ring tool for removing or replacing tire lock rings on disc wheels having openings on the face of the disc thereof, comprising a hand lever, a fulcrum member pivoted on the lever so as to divide the lever into a short end and a long end, means to limit the pivotal movement of the fulcrum member to one side of the lever, said fulcrum member being arranged on a lever so as to selectively engage the lock ring when the short end of the lever is engaged with a hole in the disc and the lever extended over said lock ring, or to abut against the face of the disc and space the lever from the face of a disc so as to form a fulcrum when the short end of the lever is in prying engagement with the lock ring and the long end of the lever is extended over said face of said disc, the short end of said lever being notched at spaced points between the fulcrum member pivot and the prying end and on the side opposite from said fulcrum member.

CLAUDE W. MARTIN.